(12) United States Patent
Henders et al.

(10) Patent No.: US 8,539,107 B2
(45) Date of Patent: *Sep. 17, 2013

(54) PERSONAL INFORMATION MANAGEMENT DATA SYNCHRONIZATION

(75) Inventors: Michael Henders, Calgary (CA); Rory Fitzpatrick, Edinburgh (GB); John Davies, Sunnyvale, CA (US)

(73) Assignee: Rockliffe Systems, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/531,052

(22) Filed: Jun. 22, 2012

(65) Prior Publication Data

US 2012/0331178 A1  Dec. 27, 2012

Related U.S. Application Data

(63) Continuation of application No. 12/567,725, filed on Sep. 25, 2009, now Pat. No. 8,209,437.

(60) Provisional application No. 61/194,572, filed on Sep. 25, 2008.

(51) Int. Cl.
*G06F 15/16* (2006.01)

(52) U.S. Cl.
USPC ........... 709/248; 709/203; 709/219; 709/225; 709/228; 709/229; 709/230; 709/246

(58) Field of Classification Search
USPC ................. 709/203, 217, 227, 230, 248, 219, 709/225, 228, 229, 246
See application file for complete search history.

(56) References Cited

U.S. PATENT DOCUMENTS

| | | | |
|---|---|---|---|
| 5,257,369 A | 10/1993 | Skeen et al. | |
| 5,859,972 A * | 1/1999 | Subramaniam et al. | 709/203 |
| 6,131,096 A | 10/2000 | Ng et al. | |
| 6,321,236 B1 | 11/2001 | Zollinger et al. | |
| 6,330,598 B1 * | 12/2001 | Beckwith et al. | 709/223 |
| 6,442,570 B1 * | 8/2002 | Wu | 707/621 |
| 6,678,248 B1 | 1/2004 | Haddock et al. | |
| 6,701,323 B2 | 3/2004 | Sashino et al. | |
| 6,826,593 B1 | 11/2004 | Acharya et al. | |
| 6,928,467 B2 | 8/2005 | Peng | |
| 7,024,451 B2 | 4/2006 | Jorgenson | |
| 7,043,525 B2 * | 5/2006 | Tuttle et al. | 709/203 |

(Continued)

OTHER PUBLICATIONS

Jonsson et al., "SyncML—Getting the mobile Internet in sync." Datasheet (online). Ericsson Review No. 3, 2001, pp. 110-115. Published Dec. 2011.

(Continued)

*Primary Examiner* — Michael Won
(74) *Attorney, Agent, or Firm* — Lewis and Roca LLP

(57) ABSTRACT

A data management application that may be implemented in a mobile device to perform two-way synchronization of electronic messages and/or PIM data with a server device. The device may be a mobile device such as a mobile phone or Smartphone, as well as a personal digital assistant, notebook computer, or other mobile device communicating using any of several wireless protocols. PIM data may include PIM application objects or other data, including but not limited to calendar, contact, and task object data. The data management application may synchronize e-mail and PIM data on a client device with that of a server where the server and client utilize one or more different protocols.

18 Claims, 12 Drawing Sheets

(56) References Cited

U.S. PATENT DOCUMENTS

| | | |
|---|---|---|
| 7,051,070 B2 | 5/2006 | Tuttle et al. |
| 7,065,588 B2 | 6/2006 | Konda et al. |
| 7,243,122 B2 | 7/2007 | Acharya et al. |
| 7,317,907 B2 | 1/2008 | Linkert et al. |
| 7,325,042 B1 | 1/2008 | Soscia et al. |
| 7,457,631 B2 | 11/2008 | Yach et al. |
| 7,526,524 B2 | 4/2009 | White |
| 7,529,820 B2 * | 5/2009 | Eatough et al. ............... 709/223 |
| 7,558,783 B2 | 7/2009 | Vadlamani et al. |
| 7,640,296 B2 * | 12/2009 | Fuchs et al. .................. 709/203 |
| 7,685,183 B2 | 3/2010 | Pace et al. |
| 7,761,586 B2 | 7/2010 | Olenick et al. |
| 7,802,004 B2 | 9/2010 | O'Rourke et al. |
| 7,933,954 B2 | 4/2011 | White |
| 7,953,794 B2 | 5/2011 | Clarke |
| 8,019,900 B1 | 9/2011 | Sekar et al. |
| 8,209,437 B2 | 6/2012 | Henders et al. |
| 2001/0037404 A1 | 11/2001 | Hafsteinsson et al. |
| 2002/0010807 A1 * | 1/2002 | Multer et al. ................. 709/328 |
| 2002/0010867 A1 | 1/2002 | Schaefer et al. |
| 2002/0055995 A1 * | 5/2002 | Beckwith et al. ............. 709/223 |
| 2002/0120779 A1 | 8/2002 | Teeple et al. |
| 2002/0188853 A1 | 12/2002 | Owhadi |
| 2003/0045301 A1 | 3/2003 | Wollrab |
| 2004/0205263 A1 * | 10/2004 | Sivaraman et al. ............. 710/21 |
| 2005/0071422 A1 | 3/2005 | Booth et al. |
| 2005/0198395 A1 * | 9/2005 | Verma et al. .................. 709/247 |
| 2006/0047648 A1 * | 3/2006 | Martin .............................. 707/4 |
| 2006/0200583 A1 | 9/2006 | Le Lann et al. |
| 2007/0226314 A1 | 9/2007 | Eick et al. |
| 2007/0260751 A1 | 11/2007 | Meesseman |
| 2008/0126475 A1 | 5/2008 | Morris |
| 2008/0168184 A1 * | 7/2008 | Freedman et al. ............. 709/248 |
| 2009/0235185 A1 | 9/2009 | Gill |
| 2010/0057835 A1 | 3/2010 | Little |
| 2010/0235434 A1 | 9/2010 | Henders et al. |
| 2011/0029681 A1 | 2/2011 | Lee et al. |
| 2011/0029931 A1 | 2/2011 | Liu et al. |
| 2011/0078332 A1 * | 3/2011 | Poon ............................ 709/248 |

OTHER PUBLICATIONS

PCT Application No. PCT/US2009/058506, International Search Report and Written Opinion mailed Jan. 26, 2010.

U.S. Appl. No. 12/567,725, Final Office Action mailed Oct. 14, 2011.

U.S. Appl. No. 12/567,725, Office Action mailed May 4, 2011.

\* cited by examiner

PERSONAL INFORMATION MANAGEMENT DATA SYNCHRONIZATION

CROSS-REFERENCE TO RELATED APPLICATIONS

The present application is a continuation and claims the priority benefit of U.S. application Ser. No. 12/567,725 filed Sep. 25, 2009 which claims the priority benefit of U.S. provisional application No. 61/194,572 filed Sep. 25, 2008, the disclosures of which are incorporated herein by reference.

BACKGROUND OF THE INVENTION

1. Field of the Invention

The present invention generally relates to mobile communication. More specifically, the present invention concerns synchronization and management of electronic messages (e-mail) and personal information management (PIM) data between a mobile device and a server.

2. Description of the Related Art

Software for performing two-way synchronization of e-mail and PIM data such as calendar, contact, task, and other data are well known in the art. Such software solutions perform synchronization between a mobile device and a server that initially receives e-mail or PIM data, such as a Microsoft® Exchange Server. The software may also synchronize e-mail and PIM data on a client device with corresponding data at the server. Changes made to e-mail or PIM data on the mobile device are recognized by the server. These changes may then be reflected at a typical (and often less mobile) client device such as a desktop computer or workstation communicatively coupled to the server.

The BlackBerry® suite of mobile devices allow for a user to access e-mail and PIM data while 'out of the office' or to generate new e-mail and PIM data while 'on the go.' The Microsoft® Exchange Server line of server products provides enterprise level management of e-mail and various types of PIM data. BlackBerry® mobile devices and Microsoft® Exchange Servers are both individually well known and widely implemented with respect to access and management of e-mail and PIM data.

To allow for a BlackBerry® mobile device to connect to a Microsoft® Exchange Server, however, requires a BlackBerry® Enterprise Server from Research in Motion Limited. This cumbersome solution implements additional software operating between the Exchange Server and mobile device. This middleware solution is required in order to allow for synchronization of e-mail and PIM data between the Smartphone and Microsoft® Exchange Server. BlackBerry® Enterprise Servers are relatively expensive costing as much as $5000 USD in some instances.

Microsoft Corporation, in turn, implements a software solution known as Microsoft® ActiveSync to be used in conjunction with Microsoft®. Exchange Server 2003 with Service Pack 1 and Microsoft® Exchange Server 2007. ActiveSync® provides the functionality of an Exchange Server, but does so specifically in the context of mobile devices. ActiveSync® does not work with a variety of devices, including BlackBerry® Smartphones.

The need and cost of a BlackBerry® Enterprise Server and the lack of inter-device functionality in the ActiveSync® software solution are just two examples facing users and information technology professionals demanding or wishing to provide for out of the office connectivity to e-mail and PIM data. These and other so-called solutions in the marketplace suffer from the inability to map object identifiers, identify objects changes, and preclude data loss. Queue and transaction management as well as message prioritization and object versioning serialization are also lacking in any number of synchronization and management solutions.

There is a need in the art for a stable, reliable, cost-effective, and easy to manage solution that allows for synchronization and management of e-mail and PIM data between a mobile device and server notwithstanding the fact that the device and server may use disparate communication or synchronization protocols.

SUMMARY OF THE CLAIMED INVENTION

In one claimed embodiment, a method for synchronizing data is claimed. The method includes accessing a first data object stored on a client, the first data object having a first format associated with a client application. An update request is generated for a second data object stored on a server. The update request has a second format associated with the server. The update request is then transmitted to the server.

A second claimed embodiment sets forth a computer-readable storage medium. A program is embodied in the storage medium. The program embodied in that storage medium may be executed by a processor to perform a method for synchronizing data. Through this method, a first data object is accessed. The data object has a first format associated with a client application. An update request is generated for a second data object. The update request has a second format associated with a server. An update request is then transmitted to the server as a result of executing the aforementioned program.

DETAILED DESCRIPTION

Embodiments of the presently disclosed invention provide for data management application that may be implemented in a mobile device to perform two-way synchronization of e-mail and PIM data with a server device. The device may be a mobile device such as a mobile phone or Smartphone, as well as a personal digital assistant, notebook computer, or other mobile device communicating using any of several wireless protocols. PIM data may include PIM application objects or other data, including but not limited to calendar, contact, and task object data. The data management application may synchronize e-mail and PIM data on a client device with that of a server where the server and client utilize one or more different communication or synchronization protocols.

Embodiments of the presently disclosed invention may further allow for mapping object identifiers, identifying changed objects, avoiding data loss, managing queues and prioritizing messages and objects, performing object versioning for serialization, and managing transactions. The data management application may be implemented in the context of a downloadable and installable software plug-in that is compatible with protocols used by disparate mobile devices (e.g., a BlackBerry® Smartphone) versus those of a corresponding server device (e.g., Microsoft® Exchange Server 2003 and/or 2007 and ActiveSync®).

Figure 1:
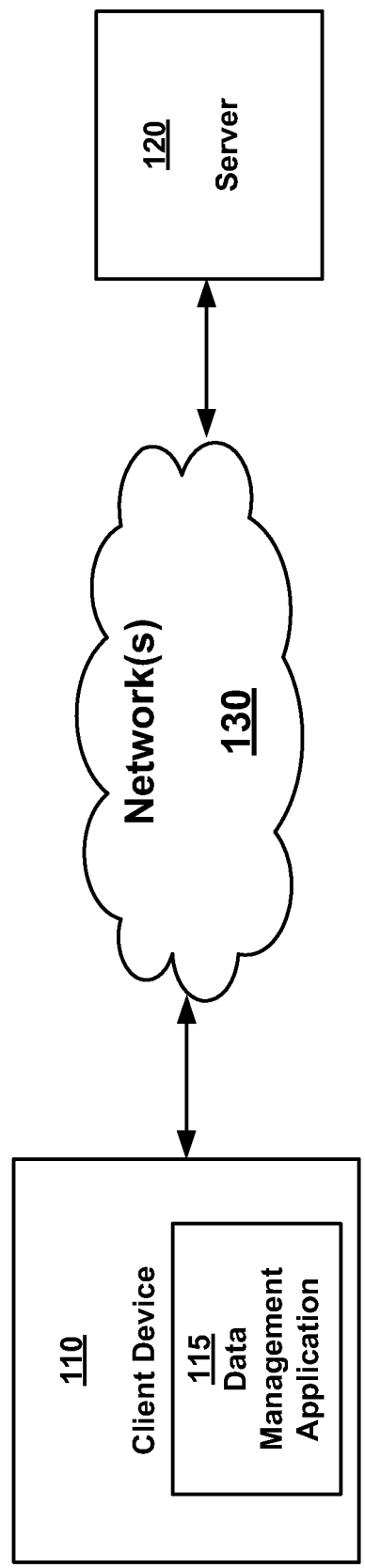
FIG. 1 illustrates a system for synchronizing e-mail and PIM data objects.

FIG. 1 illustrates a system 100 for synchronizing e-mail and PIM data objects. The system 100 illustrated in FIG. 1 includes a client device 110 and server 120. Client device 110 and server 120 may communicate with one another over one or more networks 130. The one or more networks 130 may include wireless networks provided by cellular telephone service providers as well as the Internet, wide area networks (WANs), local area networks (LANs), intranets, extranets, or private networks.

Client device 110 of FIG. 1 includes data management application 115. The data management application 115 may be stored in memory of the client device 110 and executable by a processor at the client device 110. Through execution of the data management application 115, the client device 110 may synchronize and manage data by establishing a connection between the client device 110 and the server 120. Synchronization and management occurs, in part, as a result of the client device 110 establishing a hypertext transfer protocol (HTTP) or secure hypertext transfer protocol (HTTPS) connection with the server 120 over network 130.

The data management application 115 may be maintained in any number of computer-readable storage mediums such as random access memory (RAM), read only memory (ROM), flash memory, as well as the microcode of an application specific processing device. The data management application 115 can be wirelessly downloaded to the mobile device. Alternatively, the application may be installed via a synchronization operation as might occur through a Universal Serial Bus (USB) connection to a desktop computer or as part of a manufacturer installation process. Regardless of the mode of installation, data management application 115 may execute in the background of the client device 110. The data management application 115 may allow a user to configure the name of a mail server such as server 120, a username and password as it relates to accessing data at server 120, and select which types of data a user wishes to synchronize (e.g., e-mail and calendar changes but not a notepad or contacts list).

In addition to memory and at least one processor, the client device 110 may have one or more displays and user input components such as a keypad or touch screen. The mobile device 110 may further have wireless communication capabilities to allow for operation and data exchange over Wi-Fi or cellular networks.

The client device 110 of system 100 may be implemented as a cell phone or Smartphone such as the aforementioned BlackBerry®. The present invention is not limited to the aforementioned example; other cell phone and Smartphone implementations are within the scope of the present invention. With respect to server 120, this particular component may be implemented in the context of Microsoft® Exchange Server 2003 with Service Pack 1 or a Microsoft® Exchange Server 2007. Like client device 110, the server 120 referenced in FIG. 1 (and throughout the present description) is not limited to any particular manufacturer.

An exemplary implementation of the data management application 115 may include software that can implement a Microsoft® ActiveSync® program protocol, connect and communicate with a Microsoft® Exchange 2003 (with Service Pack 1) or 2007 Server, and synchronize e-mail and PIM data to allow a BlackBerry® mobile device to work with Microsoft®. Exchange using ActiveSync® protocols—a previously incompatible combination. The data management application 115 may be compatible with other devices such as those using Java 2 Micro Edition (J2ME) and communicate using one or more protocols such as Connected Limited Device Configuration (CLDC), mobile information device protocol 2.0 (MIDP 2.0), and Java Specification Requests (JSR).

A PIM data application is executable to manage a set of data objects. A data object may be a record, entry, or other element that corresponds to an address book contact, calendar entry, task entry, an e-mail message or some other element of data. The PIM application may assign or associate a unique identifier to each object. When two different systems each have a native PIM application, the identifiers unique to each application may not necessarily match. For example, a first contact for a PIM application on a mobile device may have a unique identifier that does not match the unique identifier for the corresponding first contact in the server PIM data. This lack of correspondence can make it difficult if not impossible to accurately synchronize or otherwise process—create, read, update, delete—objects between a server and a device that identify or associate an object to be synchronized or processed with different identifiers.

In an exemplary embodiment of the present invention, execution of the data management application 115 maps unique identifiers for device objects to unique identifiers for objects on a server. The mapping may be implemented utilizing any number of methodologies including one or more hash tables or B+ trees. For example, object unique identifiers between a mobile device and a server may be mapped using two B+ trees. The first B+ tree may map mobile or other device unique identifiers to server unique identifiers. The second B+ tree may map server unique identifiers to mobile or other device unique identifiers.

One or more B+ trees may be populated as communications are transmitted between the mobile device and the server. When a request to create a new calendar object is sent from the client device to the server, the request will include the unique identifier used by the client PIM for the calendar object. When the server receives the request, the new calendar object is created, a server-side unique identifier is generated for the new calendar object, and a confirmation response is sent to the device by the server. The confirmation response includes the unique identifier associated with the new calendar object by the server.

Once received, the data management application 115 can populate the local tree with the server unique identifier (and client unique identifier) for the new calendar object. Subsequently, when the data management application 115 sends a request involving the created calendar object, it may determine the client PIM unique identifier for the calendar object, access the tree to determine the unique identifier for the calendar object used by the server, and reference or identify the calendar object in the request to the server using the server unique identifier.

If a server creates an address book entry object, the server will send a request to create a new address book entry object to the client that includes the server unique identifier for the new object. The client receives the new calendar object request and corresponding unique identifier created by the server, creates the calendar object, stores the corresponding server unique identifier in a B+ tree, and performs any other needed operations to complete the transaction.

Unique identifiers may be transmitted between a client and server in communications not associated with a request or synchronization. Communications between a client and server may include other information as well, including client device ID, server ID, time stamp information, and other data.

Figure 2:
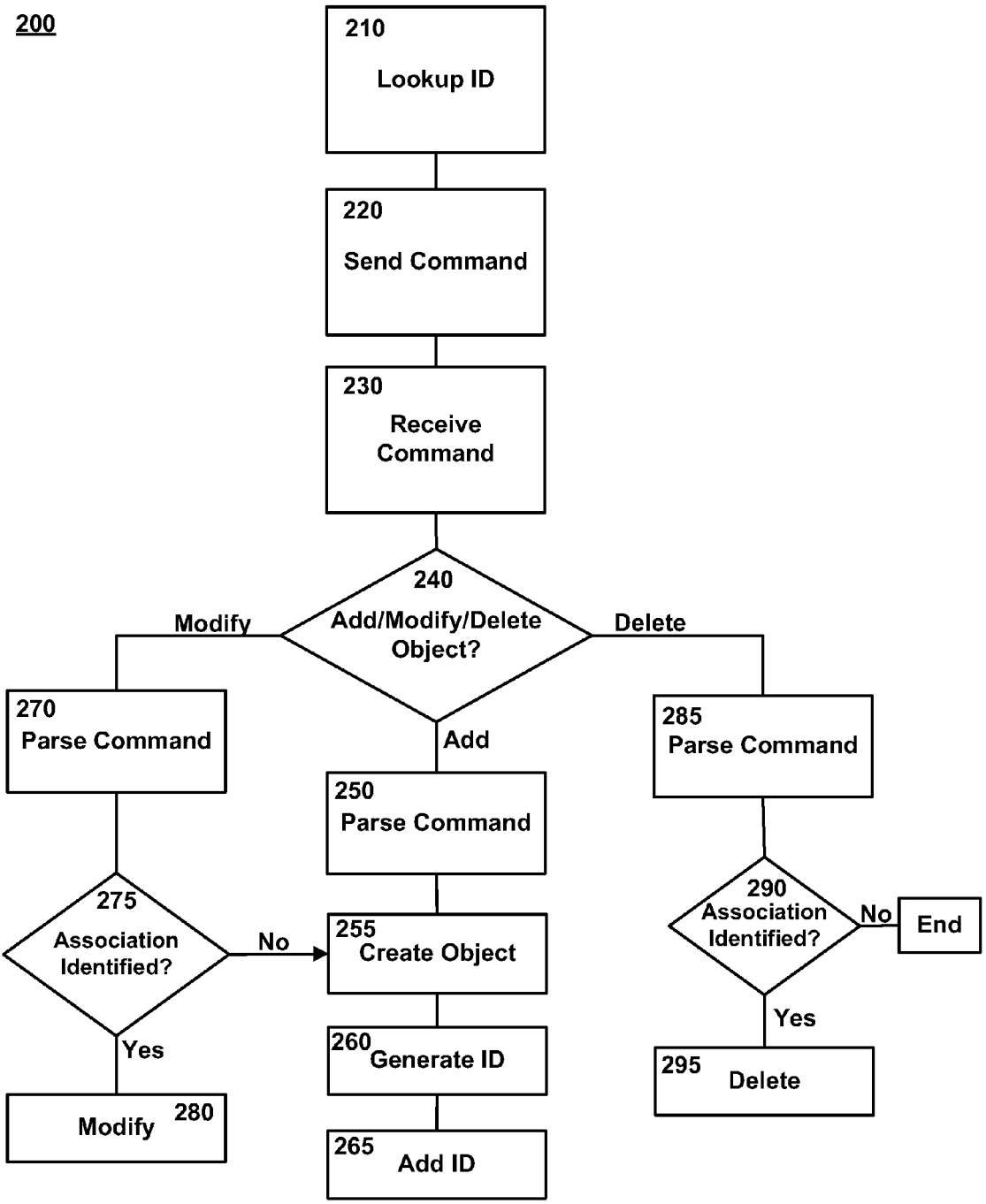
FIG. 2 illustrates a method for mapping objects stored on a device with objects stored on a server.

FIG. 2 illustrates a method 200 for mapping objects stored on a device with objects stored on a server. In step 210, for each client change to be sent to the server, a lookup of the server ID for the corresponding client ID is performed. In step 220, a command is sent to the server referencing the server ID. For each command received from the server (step 230), if the command is to add an object—a determination made at step 240—then the command is parsed at step 250 to get the server ID and the object is then created on the device at step 255. An ID is then generated for the newly created object at step 260; this newly created ID is the client ID. This newly created client ID is added to the client-server ID mapping at step 265; the map identifies the correlation between the client and the server and is (at least) stored locally at the client device 110.

If the determination at step 240 indicates that the command is to modify an entry to the client-server ID mapping, then the command is parsed at step 270 to retrieve the server ID and the updated properties of the object. A lookup to determine the client ID for the identified server ID occurs at step 275. If the client ID is found, then the object is modified at step 280. If the client ID is not found at step 275, then the object is deemed not to be present on the device and the command is treated as a command to add an object and the process continues at step 255.

If the determination made at step 240 is that the command is to delete an object, then the command is parsed at step 285 in order to identify the server ID. A lookup to determine to the client ID for the identified server ID occurs at step 290. If the client ID is found, then the object corresponding to the client ID is deleted from the device in step 295. If a corresponding client ID is not found, then the process come to an end as the object does not exist on the device.

As users manage PIM data objects, a user may change—create, read, update, or delete—objects on the client device 110. The data management application 115 referenced in FIG. 1 will periodically send synchronization requests to the server 120 to synchronize objects that have been identified or detected as changed on the client device 110. The data management application 115 may identify objects that have changed by, for example, comparing hash entries for the data. For example, a hash entry may be generated for an object, such as a user contact, wherein the entry includes data for each field of the contact object or record. The hash entry may be generated when the object is created at the device or received from the server, or in response to some other event. These hash entries can be maintained by the client device 110. B+ trees may also be utilized in the context of identifying object changes.

An additional hash may be created to compare to the pre-existing hash entries (i.e., the maintained hash entries). For example, the device address book can be periodically polled for one or more address book entries. Objects can be sequentially polled in their entirety. For example, all address book objects may be sequentially and individually polled. A new hash is created for results of the address book poll. The new hash is then compared to the existing hash. For example, one or more identification tables generated with respect to object ID mapping may be compared. If any changes are detected, objects that have changed are identified. Identification may include marking an object record in a table, adding the object unique identifier in a list, or some other manner of identifying the object.

Marking the object may include indicating the object should be created, read, updated, or deleted, or processed in some particular manner. The changes to make to the objects are indicated separately from a marking that indicates the object is to be updated. The objects to be changed are then scheduled to be sent to the server to update the corresponding server object.

Polling may be periodically performed at every 10 minute, 30 minute, or at some other periodic interval, which may be set by a user. The polling may also be performed according to a non-periodic schedule. For example, polling may occur at a time when the device is using a small portion of available processor resources, when in sleep mode, when the device is plugged in and recharging, or in some other mode of operation. With respect to e-mail messages, a notification can be received when a user deletes, creates, sends or receives a message. Message deletion, creation or other changes can be scheduled to be sent to the server for synchronization by the data management application 115.

Figure 3:
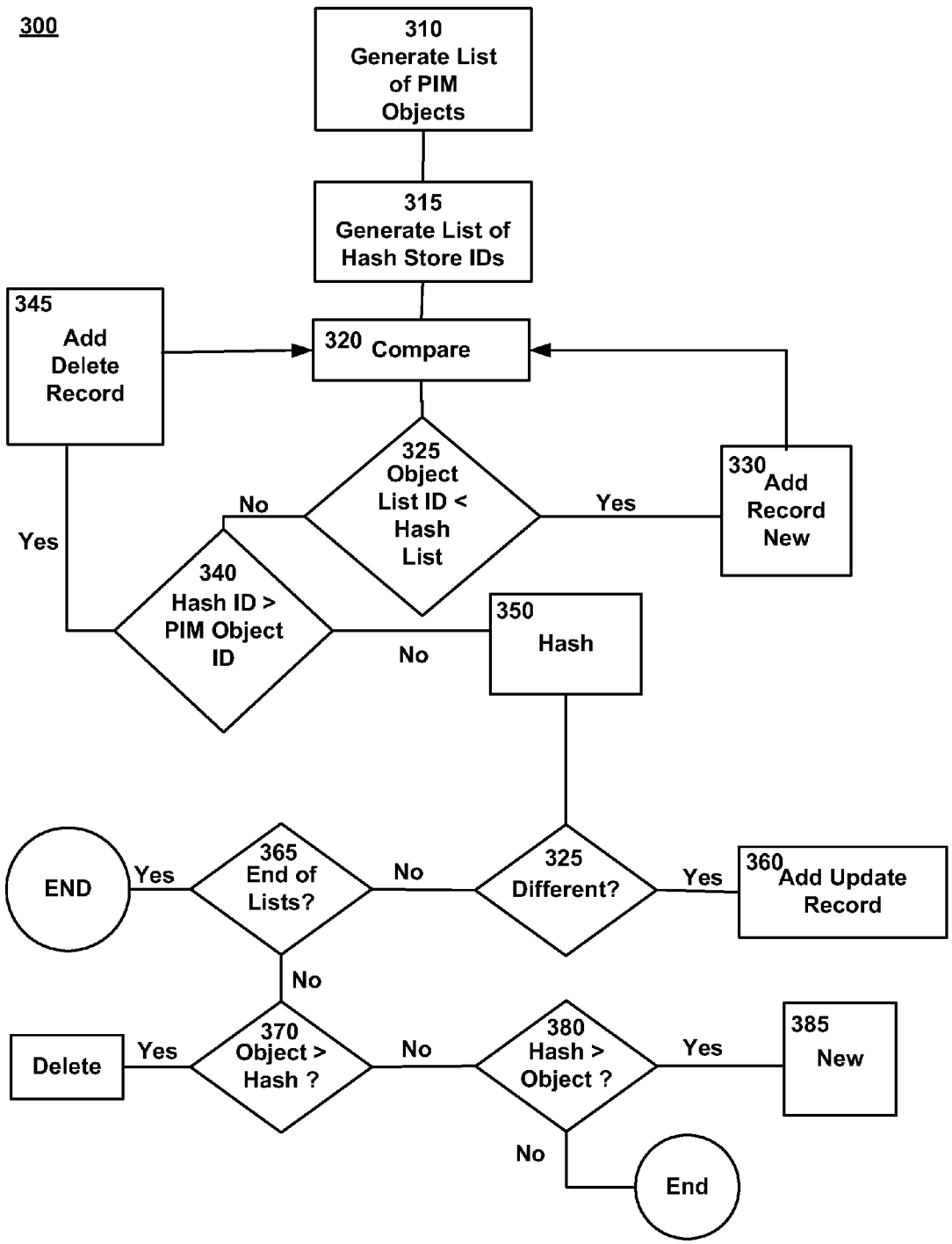
FIG. 3 illustrates a method for identifying changed objects between a mobile device and a server.

FIG. 3 illustrates a method 300 for identifying changed objects between a mobile device 110 and a server 120. The method 300 may be called when the address book or calendar of the client device 110 is polled to check for changed objects and returns a list with the client ID and the type of change (e.g., new, updated, deleted).

In step 310 of FIG. 3, a sorted list of PIM objects on the device 110 is generated, the list sorted by ID. A sorted list of IDs from a hash store is similarly generated in step 320. The IDs of the PIM object list and the hash store list are then compared beginning in step 320. At step 325, a determination is made as to whether the next ID from the PIM object list generated in step 310 is smaller than the next ID from the hash store list generated in step 315. If so, then the PIM object has been added and a new change record is added at step 330. The process continues at step 320 albeit with the 'next' ID from the PIM object list.

If the determination at step 325 is in the negative, then a determination as to whether the ID from the hash list is larger than that of the PIM object list is made at step 340. If so, then an object has been removed and a deleted change record is added at step 345 and the process continues at step 320 albeit with the 'next' ID from the hash list.

If there is no difference at steps 325 and 340, then the PIM object from the PIM object list is hashed with the hash in the store for the corresponding ID in the hash list at step 350. If the hashes are different following a comparison at step 355, then an updated change record is added in step 360. If the hashes are the same, a determination is next made as to whether there are objects still left in the PIM object and hash lists at step 365. If there are no objects left in either list, then the process comes to an end.

If the PIM object list still has objects left in the list as determined at step 370 and the hash list is at its end, then deleted change records are added to the remaining IDs from the hash list at step 375. If the PIM object list has no remaining objects, but the hash list has remaining IDs as determined at step 380, then new change records are added for all remaining objects in the PIM object list at step 385. Otherwise, the process come to an end.

Figure 4:
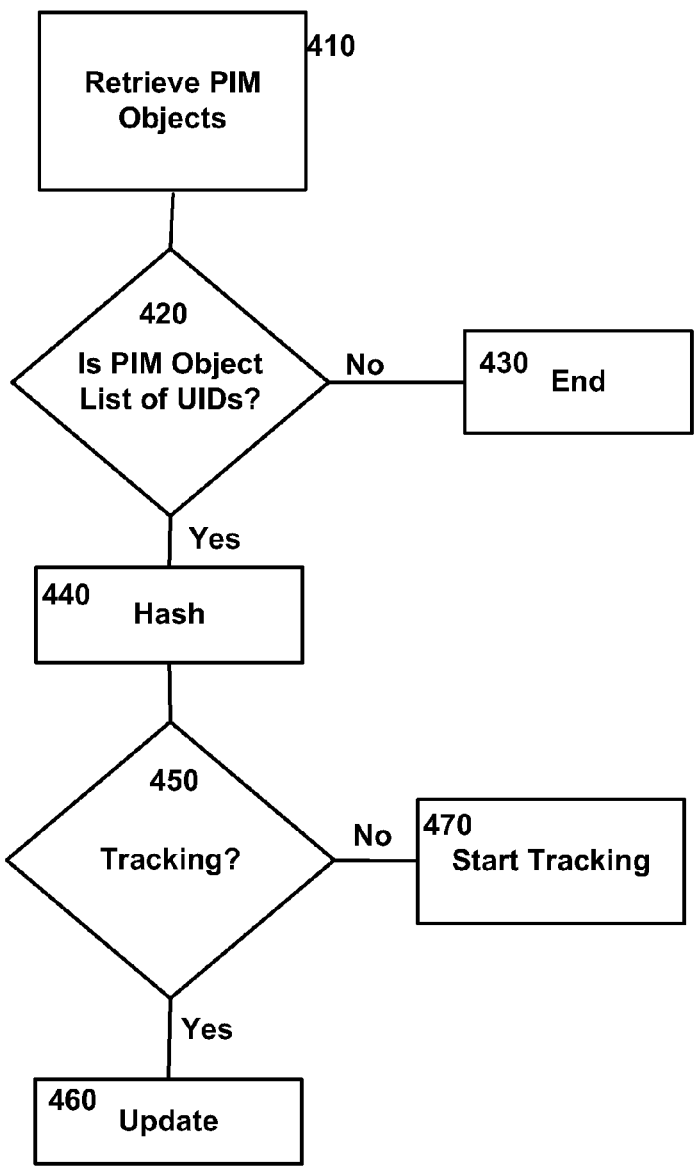
FIG. 4 illustrates a method executed during a synchronization process after changes sent by a server have been processed.

FIG. 4 illustrates a method 400 executed (i.e., called) during a synchronization process after changes sent by the server have been processed; changes are tracked in a list that is passed to an updated record store. The method 400 of FIG. 4 is useful as the process for finding a PIM object on some client devices (e.g., a BlackBerry® device) is slow. Instead of iterating through updated IDs and looking up each record, it may be faster to loop through all PIM objects in a PIM list and update those for which an entry exists in an update ID store.

In method 400, for each PIM object of the PIM list, the ID of the PIM object is retrieved in step 410. A determination is then made in step 420 as to whether the ID exists in a list of updated IDs. If the ID is not in the list, then the method 400 of FIG. 4 comes to an end at step 430. If the ID is in the list, then a hash operation is performed on the PIM object at step 440. If the hash of the PIM object is already being tracked, as determined at step 450, then the hash associated with the object is updated with the new hash at step 460. If the hash is not yet being tracking, then tracking commences in step 470.

Figure 5:
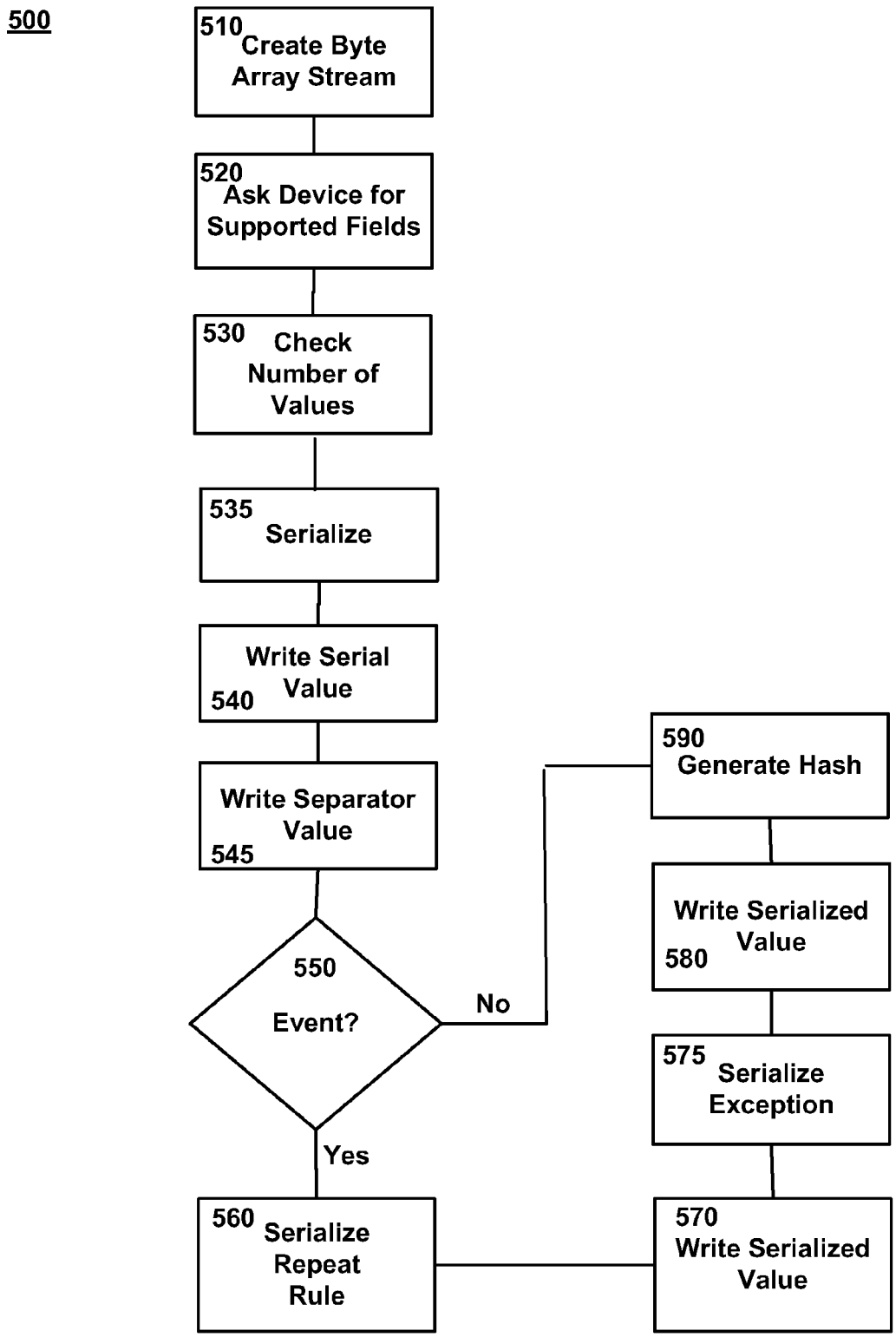
FIG. 5 illustrates a method for calculating a hash on a PIM object using a standard MD5 hash algorithm.

FIG. 5 illustrates a method 500 for calculating a hash on a PIM object using a standard MD5 hash algorithm. The method 500 of FIG. 5 may be implemented on any device that supports the Java Specification Request 75 for accessing the EventList (Calendar) and ContactList (Address book). The method 500 of FIG. 5 will likewise work in the context of a To Do List.

In step 510, a byte stream array is created to store serialized PIM object fields. The device is then asked for all fields supported by the particular PIM object fields in step 520. For each supported field, the number of values is checked in step 530. For each value, the field is serialized based upon its particular type in step 535. This serialization may include types such as byte, Boolean, date, int, string, and string array). In step 540, the serialized value is written to the stream; a separator value is written to stream in step 545.

A determination is made at step 550 as to whether the PIM object is that for an event. If the object is for an event, then the repeat rule for the event is serialized at step 560. That serialized value is written to the stream in step 570. Event exceptions are serialized in step 575 and written to the stream in step 580. An MD5 hash is then generated on the stream at step 590, as likewise occurs if the determination at step 550 concludes that the object is not an event.

In some instances, a PIM application on a client device may not support the same format of objects, records, fields or properties as the PIM application on a server. For example, a client device PIM application may only have ten fields for an address book contact object while a server PIM application may support up to fifty fields or more for an address book contact object. A situation may therefore exist where an object created by a server PIM application has fields or properties that a client PIM application cannot support. This can result in data loss when transferring, synchronizing or otherwise communicating the data object between the server and the client.

To avoid data loss, the PIM application data that is only supported by one of the client device PIM application or server PIM application is managed to avoid data loss. Managing a data object to avoid data loss can include mapping fields or properties from both object formats, which correspond to each other, and handling fields or properties that do not correspond in a separate manner.

Consider a case when a server supports more fields for an address book object than the client device PIM application. When the server receives a new address book object with data in a field not supported in the client device PIM application, the data management application will create a new object which maps as many of the server created object fields to corresponding client object fields. Fields that do not map from the server object to the client object may be stored elsewhere on the client or ignored.

When a client updates an object for which the server supports more fields or properties, there is a possibility that fields not supported by the client have values at the server. Simply sending an update request by the client with empty values for unsupported data object fields may cause those unsupported fields to be erased. Therefore, the data for the unsupported fields is retrieved, placed in an update request to be sent to the server, the data in the fields of the client data object are added to the object in the update request, and the update request is transmitted to the server with all data for the object, including data not supported by the client device PIM.

In some instances, the unsupported data may be retrieved locally from the client device if the data is stored locally. The entire data object may similarly be retrieved from the server. The retrieved copy is then updated with data from the corresponding client device object. In such an embodiment, only the fields supported by the client device PIM will be updated in the retrieved copy. The updated retrieved copy is then sent back to the server as part of an update request.

Figure 6:
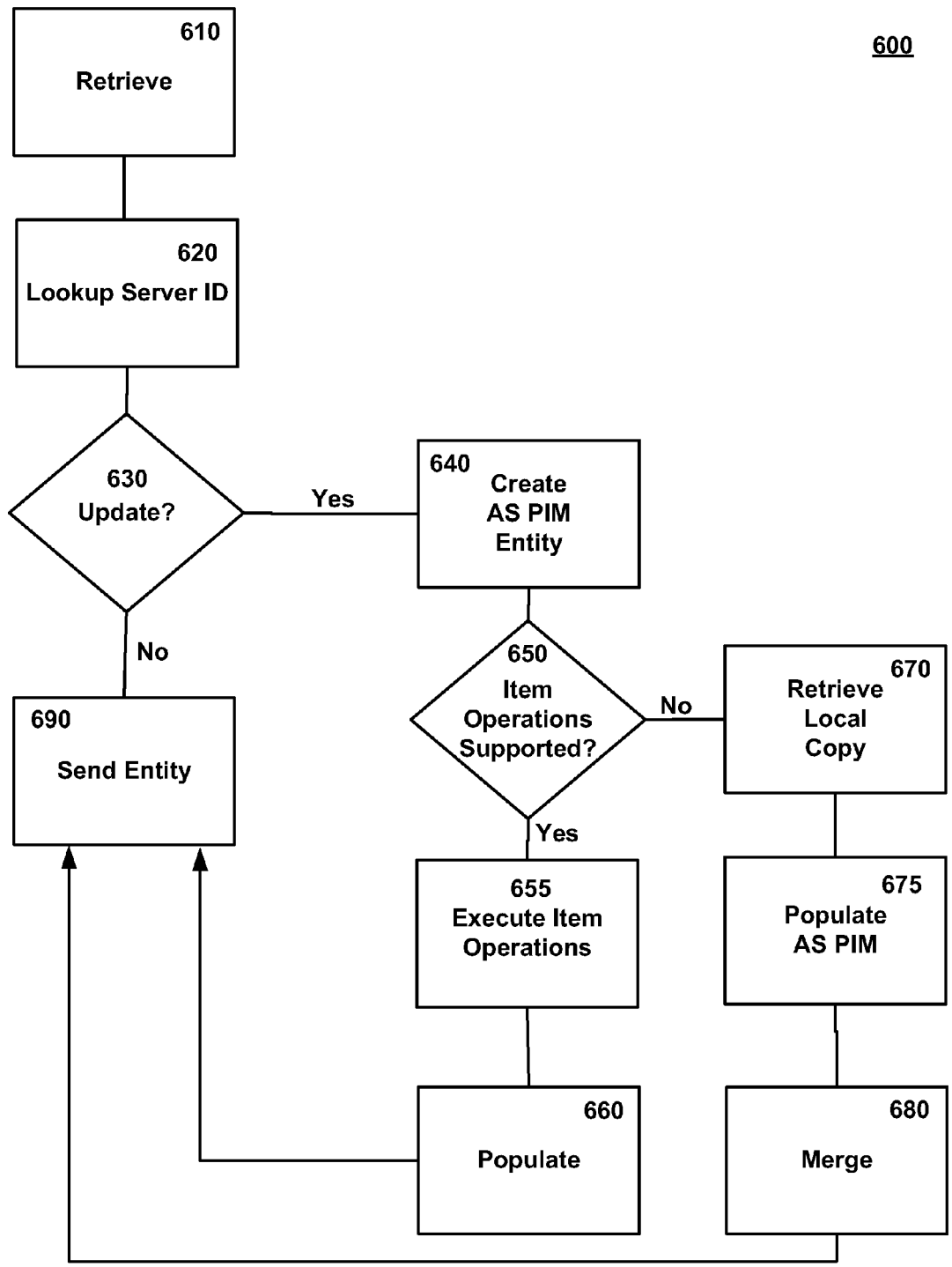
FIG. 6 illustrates a method for avoiding data loss.

FIG. 6 illustrates a method 600 for avoiding data loss. The method 600 of FIG. 6 is specifically referenced in the context of ActiveSync®. Notwithstanding, other software, server, and client device environments are not meant to be excluded from the application of method 600.

In step 610, for each client change, the PIM object is retrieved from a PIM list at the client device. In step 620, a corresponding server ID is looked up in the client-server ID map. A determination is made at step 630 as to whether the type of change is an update. If the change is an update, then an AS PIM entity is created to represent the state of the object of a corresponding server at step 640.

If the server (i.e., an ActiveSync® server) supports the ItemOperations command (as determined at step 650), then the ItemOperations command is executed at step 655 in order to retrieve the current state of the object from the server. The ActiveSync® PIM entity object is then populated with the fields returned by the server at step 660.

If the ItemOperations command is not supported as determined at step 650, then a locally stored copy of unsupported fields are retrieved at step 670. The ActiveSync® PIM entity object is populated at step 675 and the client object and server object are then merged at step 680. The fields of the client objects take precedence in such a merger operation.

Returning to step 630, if the change is not that of an update, then no merger is required. The entity object is sent to the server at step 690. Server delivery (step 690) also occurs following the population step of step 660 as well as at merger step 680.

Mobile devices have a limited amount of memory. As a result, it may be desirable to control the size of data required for messages and/or objects contained on the client device. A message queue may be maintained that prioritizes messages based on receipt date and when viewed. Message data may be stored for messages within the queue and not stored for messages transitioned or "pushed" out of the queue.

For example, the queue may be implemented as a "backwards" queue in that messages in the front of the queue are "removed." Removal of a message from a queue may result in deletion of the message data, transferring the message data to another local or remote location in memory, or allowing the memory containing the message data to be overwritten locally at the client device. In such an embodiment, messages are prioritized and moved to the back of the queue when they are first received or when they are viewed. Thus, as messages are received or viewed, other messages in the queue are moved to the front and eventually "removed" from the queue. Message data for recent messages and messages most recently viewed can be stored longer than message data for older messages and messages for which a user has not viewed.

Figure 7:
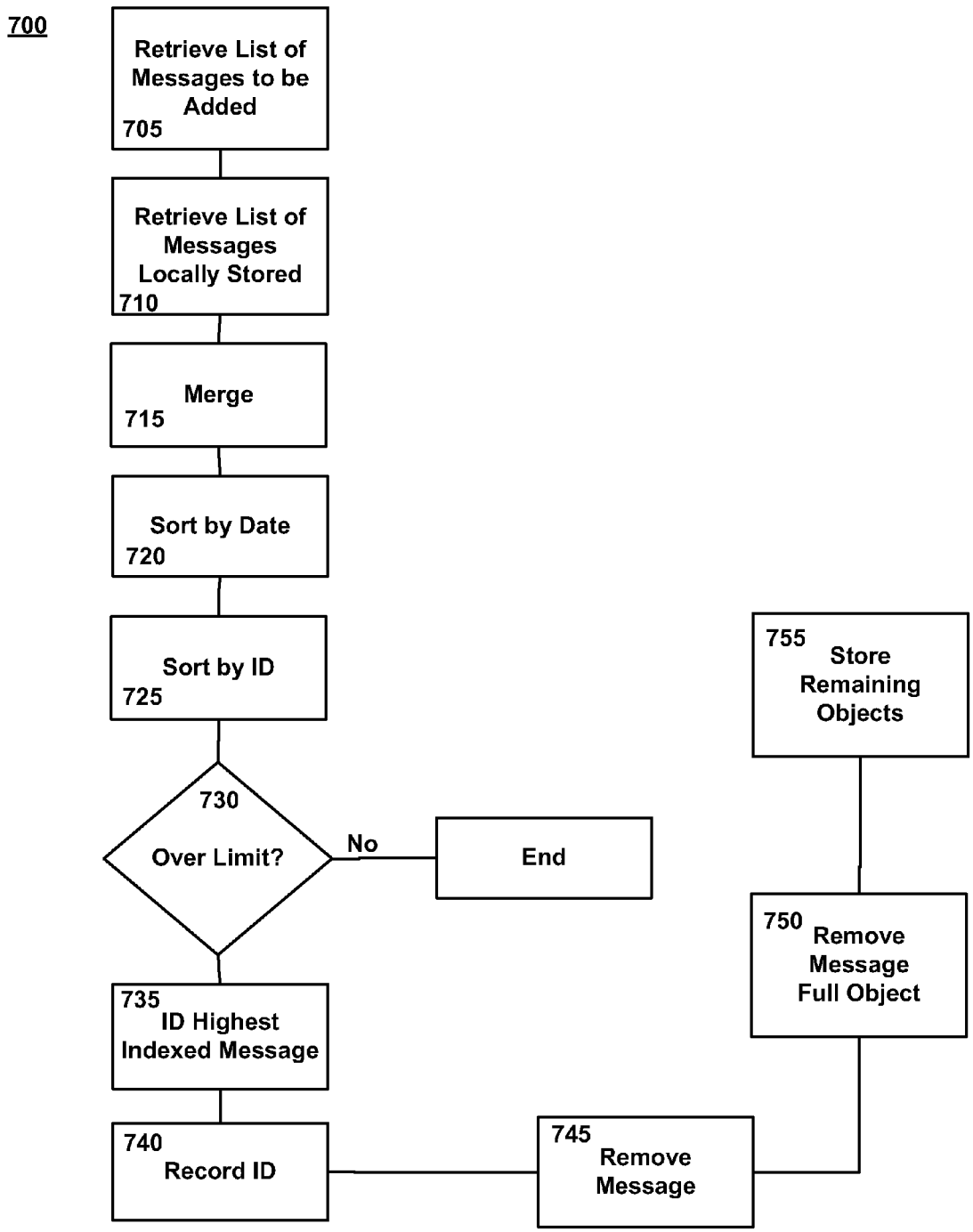
FIGS. 7, 8 and, 9 illustrate methods for priority queue management.
Figure 8:
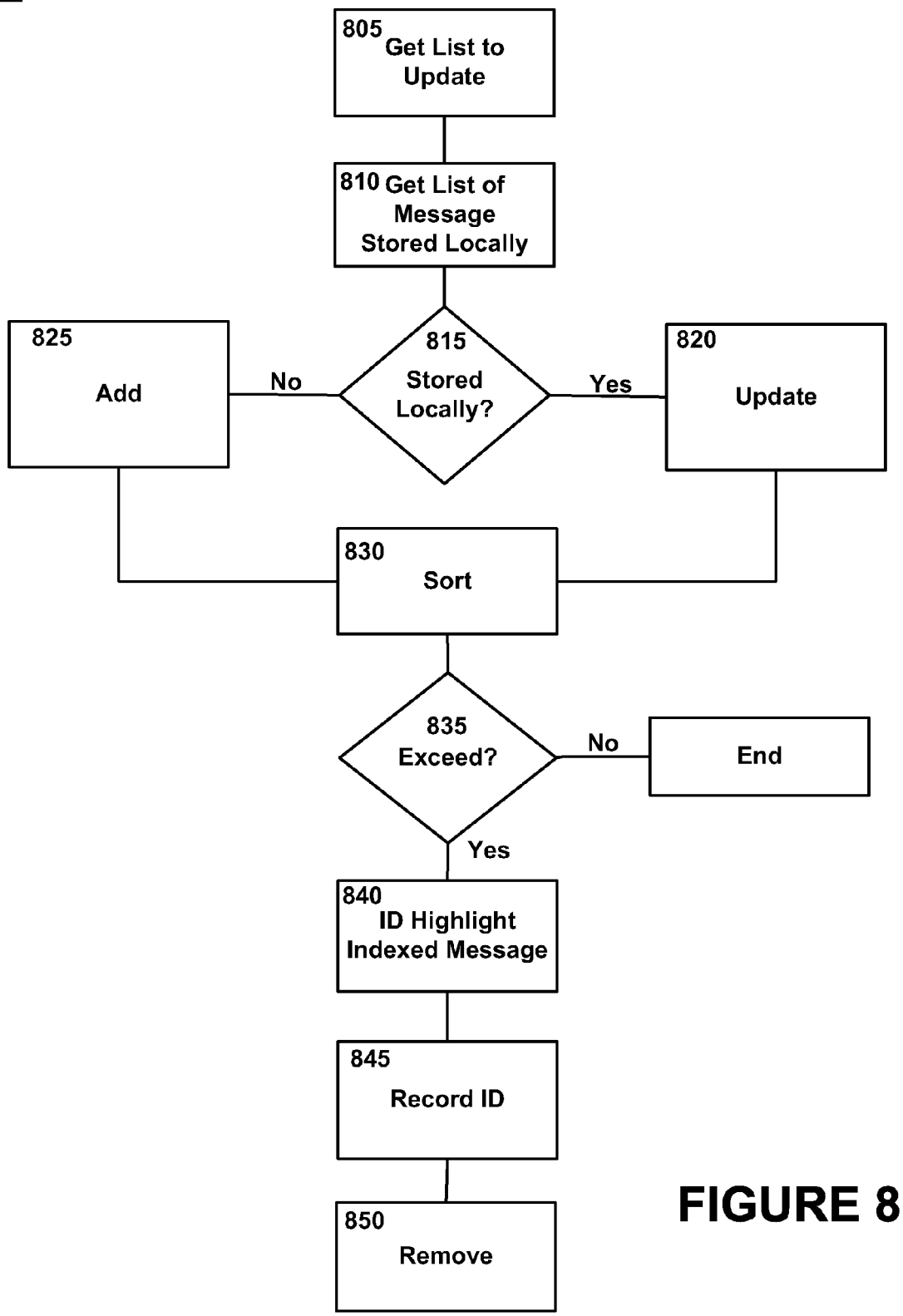
Figure 9:
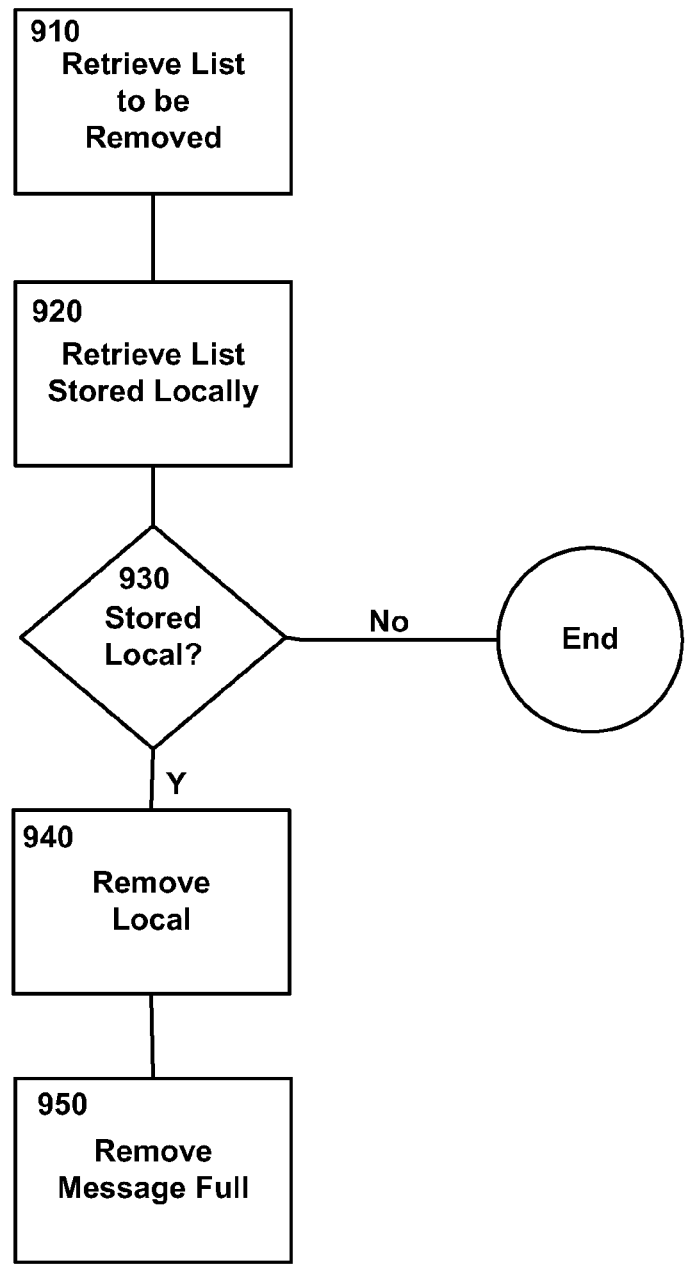

FIGS. 7, 8 and 9 illustrate exemplary methods for priority queue management. The priority queue may be a part of a mail summary store used to manage which messages are kept and which are thrown out when the store runs out of memory or reaches a configured maximum capacity. A B+ Tree may be utilized where message full objects are stored keyed by the message ID and a hash map where the message summary objects are stored keyed by the message ID.

In the method 700 of FIG. 7, a list of message to be added is retrieved in step 705. A list of message locally stored is retrieved in step 710. The two lists are merged in step 715; the merged list is sorted by date received in step 720 and then by ID in step 725. A determination is made in step 730 as to whether the number of messages in the list is in excess of a pre-configured capacity of limit. If the messages are not in excess of the limit, then the process ends until it is later necessary to determine whether to manage the priority queue.

If the storage capacity or limit has been exceeded as determined in step 730, then the highest indexed message from the list is identified in step 735, the ID of that message is recorded in step 740, and the message is then removed from the list in step 745. For each ID recorded in step 740, a message full object is removed from local storage and the list of messages to be added at step 750. The message full object for the remaining objects to be added is stored at step 755.

The method 800 of FIG. 8 commences at step 805 with the retrieval of a list of messages to be updated. At step 810, a list of messages stored locally is retrieved. For each message to be updated, if the message is stored locally as determined at step 815, then the locally stored message is updated at step 820. If the message is not stored locally, then the message to be updated is added to the local store as if it was new at step 825.

The list of messages to be stored locally is then sorted at step 830. If the number of messages is greater than the pre-configured capacity as determined at step 835—no further action being necessary if the number of messages are not in excess of capacity—then the highest indexed message is identified in step 840. The ID of the message is recorded at step 845 removed from the list in 850. For each ID recorded at step 845, the message full object is removed from local storage at step 850.

The method 900 of FIG. 9 commences at step 910 with the retrieval of a list of messages to be removed, followed by retrieval of a list of messages stored locally at step 920. A determination is made at step 930 as to whether messages exist in local storage for each message to be removed. If the message does not exist locally, then the method 900 comes to an end. If the message does exist in local store, then the message is removed in step 940. The message full object is subsequently removed in step 950.

PIM applications and other applications that access and use PIM objects may be updated with new versions. Some new versions may not be compatible with older data object formats. To avoid errors and data loss, data objects can be updated to comply with new application versions. To avoid errors or comprising data due to version incompatibility, the data management application 115 of FIG. 1 will attempt to deserialize a client configuration.

For example, the application 115 will identify whether an accessed object to be updated is compatible with a most recent version. Version data for objects may be stored in the base class of the object. If the accessed object, for example an address book entry, is not compatible with a new version, the object is updated as discussed above. In some embodiments, other objects similar to the accessed object may be updated as well. In some instance, only the accessed object is updated to comply with requirements of the new version.

An object and message transaction may require a series of steps to complete; for example, updating a calendar object at a server based on a changed corresponding calendar object at a client device. The client calendar object may be marked for updating at the server. The update might then be scheduled, update request generated, and the request then sent to the server. The server may receive the request, update the corresponding calendar object, generate a confirmation response, and then transmit the confirmation response to the client. The calendar object update transaction may be interrupted at any of these steps, resulting in an incomplete transaction. This may cause an undesirable result, especially if the transaction is not completed at some time after the interruption.

The data management application 115 may implement a policy of managing transactions such that interrupted transactions can be identified and completed at a later time. Steps in a transaction may be logged or otherwise recorded. As transactions are scheduled, the status of the transaction is not changed to a complete state until the transaction is completely finished; thus, the transaction is not marked as complete merely because the transaction has been initiated.

To detect non-completed transactions, a transaction log may be checked upon restart after a hard reset, after an error condition or state occurs, or based on some other event that may indicate a condition occurred that interrupted a transaction in progress. In some embodiments, the transaction log may be periodically checked. If the transaction log indicates that a transaction was interrupted before it completed, the transaction may be added to a transaction queue for completion.

Figure 10:
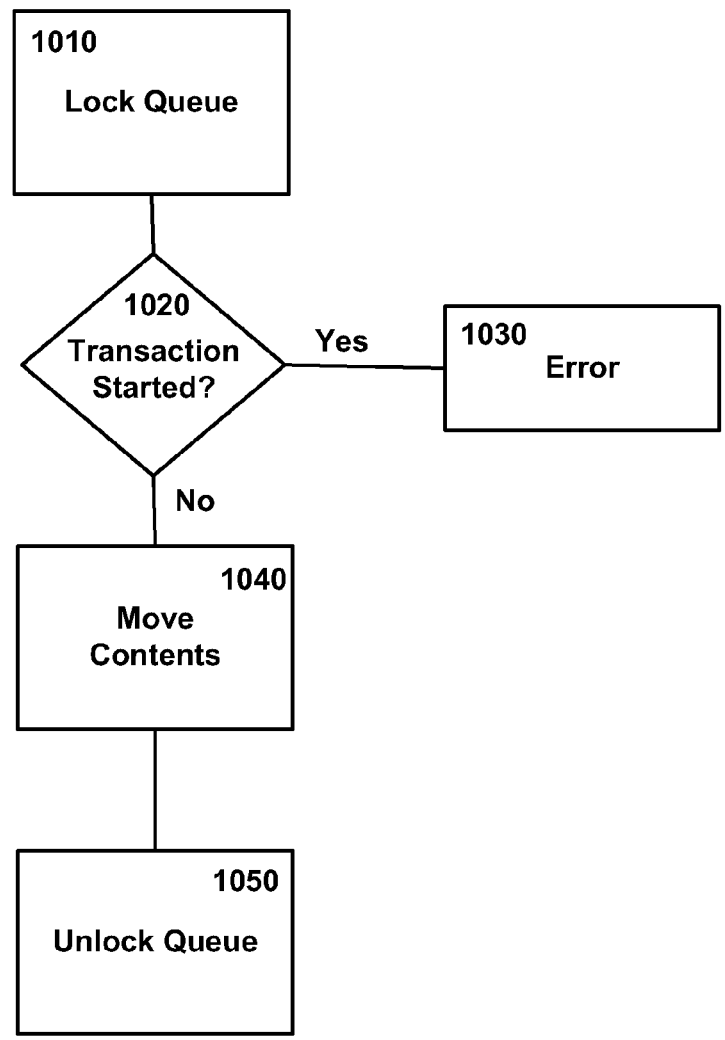
FIG. 10 illustrates a method for transaction management at the start of a transactional synchronization process.

FIG. 10 illustrates a method 1000 for transaction management at the start of a transactional synchronization process. In step 1010, a client change queue is locked to ensure thread safety. A determination is made at step 1020 to determine if a transaction has already started. If a transaction has already commenced at step 1020, then an error is returned at step 1030. If the transaction has not commenced, then the content of a client change queue are moved to an in progress queue at step 1040 and the client change queue is then unlocked at step 1050.

Figure 11:
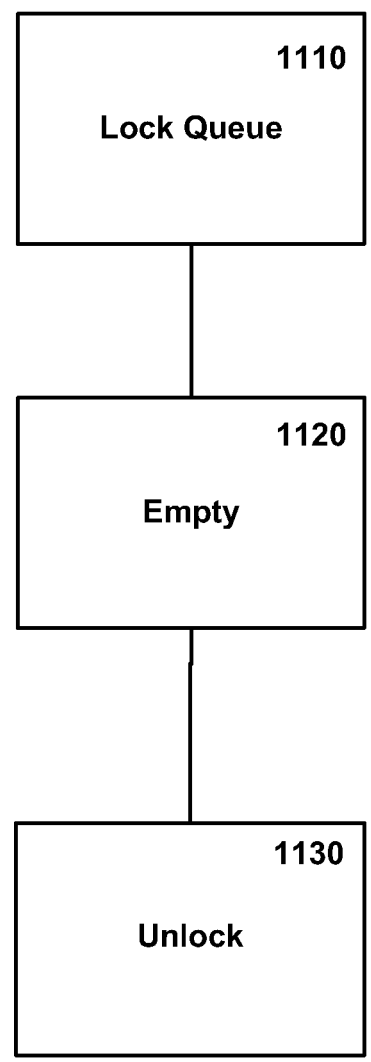
FIG. 11 illustrates a method for transaction management called when a synchronization process is successfully completed.

FIG. 11 illustrates a method 1100 for transaction management called when a synchronization process is successfully completed. In step 1110, the client change queue is locked to ensure thread safety. The in progress queue is emptied at step 1120 and the client change queue unlocked at step 1130.

Figure 12:
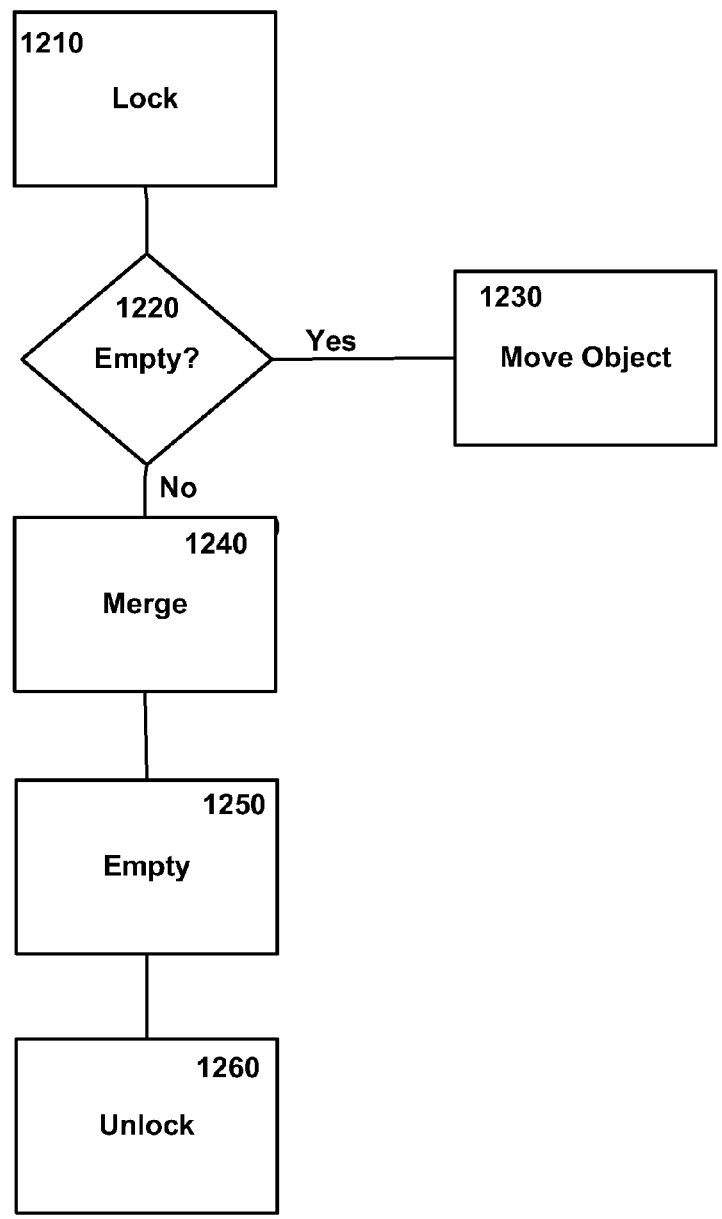
FIG. 12 illustrates a method for transaction management when an error occurs.

FIG. 12 illustrates a method 1200 for transaction management when an error occurs. The client queue is locked at step 1210. A determination is then made at step 1220 as to whether the client change queue is empty; that is, have any further changes occurred? If the queue is empty, then objects are moved from an in progress queue back to the changes queue at step 1230. If the queue is not empty as determined at step 1220, then objects are merged from the in progress queue with newer changes to a changes queue in step 1240. The in progress queue is then emptied at step 1250 and the changes queue unlocked at step 1260.

The foregoing detailed description has been presented for purposes of illustration and description. Said description is not intended to be exhaustive or to otherwise limit the invention as claimed below. Modifications and variations are possible in light of the above teachings including the combination of various methodologies and processes. The scope of the present invention is intended to be defined and limited only by the claims appended hereto.

What is claimed is:

1. A system for synchronizing data on a client device with data stored on a server, the system comprising:
 a processor;
 memory; and
 an application stored in memory and executable by the processor to:
  access a first data object stored on the client device and having a data format associated with the client device;
  access a second data object stored on the server and having a second data format associated with the server;
  map fields that correspond to the second data object stored on the server and the first data object stored on the client device as supported fields;
  manage fields that do not correspond between the second data object stored on the server and the first data object stored on the client device as unsupported fields;
  initiate an update request for updating the second data object stored on a server;
  configure an update request object for transmission to the server; and
  transmit the update request object with a data object that includes all fields in the second data object stored on the server, the update request maintaining the state of unsupported fields of the second data object stored on the server and updating the state of supported fields of the second data object stored on the server.

2. The system of claim 1, wherein the first data object and the second data object are personal information management data objects for a user.

3. The system of claim 1, wherein the application is further executable by the processor to access a server identifier corresponding to a client identifier, and the update request transmitted to the server is associated with the server identifier.

4. The system of claim 1, wherein the application is further executable by the processor to perform a hash on a set of data objects stored at the client device to determine changes to the set of data objects, and wherein the update request is generated based on the hash.

5. The system of claim 1, wherein the first data object includes fewer fields than the second data object.

6. The system of claim 5, wherein the update request for the second data object includes fields stored at the client and excluded from the first data object.

7. The system of claim 1, wherein the application is further executable by the processor to modify a queue of update requests to transmit to the server based on the number of messages in the queue.

8. The system of claim 7, wherein modifying the queue includes removing update requests based on an index for each update request.

9. The system of claim 1, wherein the application is further executable by the processor to detect that an incomplete data object update occurred.

10. The system of claim 1, wherein the application is further executable by the processor to match unique identifiers for client objects to unique identifiers for server objects.

11. The system of claim 1, wherein the client device is a smart phone.

12. The system of claim 1 wherein the application stored in memory and executable by the processor on the client device manages the state of the unsupported fields corresponding to one or more update requests by storing the unsupported fields in a separate location from the first data object stored on a client device and configuring an update request object for transmission by:
 retrieving the unsupported fields corresponding to a particular update request from the separate location on the client device after an update request is initiated,
 creating an update request object containing the unsupported fields corresponding to the particular update request, and
 adding the supported fields corresponding to the particular update request to the corresponding update request object.

13. The system of claim 1 wherein the application stored in memory and executable by the processor on the client device manages the state of the unsupported fields corresponding to one or more update requests by storing all of the fields in a separate location from the first data object stored on a client device and configuring an update request object for transmission by:
 retrieving the all of the fields corresponding of the second data object to a particular update request from the separate location on the client device after an update request is initiated,
 creating an update request object containing all of the fields corresponding to the particular update request, and
 updating the supported fields corresponding to the particular update request to the corresponding update request object.

14. The system of claim 1 wherein the application stored in memory and executable by the processor on the client device manages the state of the unsupported fields corresponding to one or more update requests and configuring an update request object for transmission by:
 retrieving the second data object stored on a server associated with the server that corresponds to a particular update request and creating an update request object containing the second data object retrieved from the server after an update request is initiated, and
 updating the supported fields corresponding to the particular update request with data from the corresponding first data object stored on the client device.

15. A method for synchronizing data on a client device with data stored on a server, the method comprising:
 accessing a first data object stored on the client device having a first data format associated with the client device;
 accessing a second data object stored on a server having a second data format associated with the server;
 mapping fields from that correspond between the second data object stored on the server and the first data object with stored on the client device as supported fields;
 managing fields that do not correspond between the second data object stored on the server and the first data object stored on the client device to as unsupported fields;
 initiating an update request for updating the second data object stored on a server;
 configuring an update request object for transmission to the server; and
 transmitting the update request object with a data object that includes all fields in the second data object stored on the server, the update request maintaining the state of unsupported fields of the second data object stored on the server and updating the state of supported fields of the second data object stored on the server.

16. The method of claim 15 wherein the client device manages the state of the unsupported fields corresponding to one or more update requests by storing the unsupported fields in a separate location from the first data object stored on a client device and configuring an update request object for transmission by:

retrieving the unsupported fields corresponding to a particular update request from the separate location on the client device after an update request is initiated, creating an update request object containing the unsupported fields corresponding to the particular update, and adding the supported fields corresponding to the particular update request to the corresponding update request object.

17. The method of claim 15 wherein the client device managing the state of the unsupported fields corresponding to one or more update requests by storing all of the fields in a separate location from the first data object stored on a client device and configuring an update request object for transmission by:

retrieving the all of the fields corresponding of the second data object to a particular update request from the separate location on the client device after an update request is initiated, creating an update request object containing all of the fields corresponding to the particular update request, and updating the supported fields corresponding to the particular update request to the corresponding update request object.

18. The method of claim 15, wherein the client device manages the state of the unsupported fields corresponding to one or more update requests and configuring an update request object for transmission by:

retrieving the second data object stored on a server associated with the server that corresponds to a particular update request and creating an update request object containing the second data object retrieved from the server after an update request is initiated, and updating the supported fields corresponding to the particular update request with data from the corresponding first data object stored on the client device.

* * * * *